US011461886B2

(12) United States Patent
Polak et al.

(10) Patent No.: US 11,461,886 B2
(45) Date of Patent: Oct. 4, 2022

(54) MONITORING WEAR OF DOUBLE ROLL CRUSHER TEETH BY DIGITAL VIDEO PROCESSING

(71) Applicant: SYNCRUDE CANADA LTD. in trust for the owners of the Syncrude Project as such owners exist now and in the future, Calgary (CA)

(72) Inventors: Mark Polak, Edmonton (CA); Dan Wolfe, Edmonton (CA); Dustin Stuyt, Fort McMurray (CA)

(73) Assignee: SYNCRUDE CANADA LTD., Calgary (CA), in trust for the owners of the Syncrude Project as such owners exist now and in the future ( * ) Notice: Subject to any disclaimer, the term of this patent is extended or adjusted under 35 U.S.C. 154(b) by 172 days.

(21) Appl. No.: 16/924,749

(22) Filed: Jul. 9, 2020

(65) Prior Publication Data
US 2021/0012484 A1 Jan. 14, 2021

Related U.S. Application Data

(60) Provisional application No. 62/872,404, filed on Jul. 10, 2019.

(51) Int. Cl.
*G06T 7/00* (2017.01)
*G06T 7/11* (2017.01)
(Continued)

(52) U.S. Cl.
CPC ............ *G06T 7/0004* (2013.01); *G06T 7/11* (2017.01); *G06T 7/215* (2017.01); *G06T 7/62* (2017.01);
(Continued)

(58) Field of Classification Search
CPC ... G06T 7/11; G06T 7/62; G06T 7/215; G06T 7/0004
See application file for complete search history.

(56) References Cited

U.S. PATENT DOCUMENTS

| 4,399,554 A | * | 8/1983 | Perkins, III | ............ G06T 7/0008 382/199 |
| 6,796,709 B2 | * | 9/2004 | Choi | ..................... G01J 5/0022 416/61 |

(Continued)

FOREIGN PATENT DOCUMENTS

CA 3086143 A1 * 1/2021 ........... G06T 7/0004

OTHER PUBLICATIONS

Yang J., Zhang H., Peng G., "Time-Domain Period Detection in Short-Duration Videos", Signal, Image and Video Processing, vol. 10, No. 4, Apr. 2016, pp. 695-702.

(Continued)

*Primary Examiner* — Mia M Thomas
(74) *Attorney, Agent, or Firm* — Bennett Jones LLP (57) ABSTRACT

A method, related system and related computer program product are provided for monitoring wear of teeth of a drum of a double roll crusher. A processor receives a digital video capturing rotation of the drum and the teeth. For each frame of the digital video, the processor segments the frame into groups of contiguous pixels, wherein each group is representative of one of the teeth. The processor determines parameter indicative of a geometry of at least one of the teeth based on segmented groups of contiguous pixels in at least one of the frames of the digital video. The processor generates a human-readable report based on the parameter indicative of the geometry of the at least one of the teeth.

11 Claims, 9 Drawing Sheets

(51) Int. Cl.
*G06T 7/215* (2017.01)
*G06T 7/62* (2017.01)

(52) U.S. Cl.
CPC ............... *G06T 2207/10016* (2013.01); *G06T 2207/30164* (2013.01)

(56) References Cited

U.S. PATENT DOCUMENTS

| | | | |
|---|---|---|---|
| 8,411,930 B2 | 4/2013 | Ridley et al. | |
| 9,886,754 B2 | 2/2018 | Lim et al. | |
| 10,843,875 B2* | 11/2020 | Smith | G01C 3/06 |
| 11,155,416 B2* | 10/2021 | Murphy, Jr. | B65G 15/54 |
| 2010/0077591 A1* | 4/2010 | Sanvaliya | B02C 4/08 29/700 |
| 2010/0142759 A1* | 6/2010 | Ridley | E02F 9/2808 382/107 |
| 2011/0248549 A1* | 10/2011 | Knotts | B02C 4/08 228/124.1 |
| 2013/0279750 A1* | 10/2013 | Zhou | G06T 7/0002 382/103 |
| 2014/0254862 A1* | 9/2014 | Sobczak | G06T 7/0004 382/100 |
| 2015/0085123 A1* | 3/2015 | Tafazoli Bilandi | G01S 17/06 348/148 |
| 2015/0211213 A1* | 7/2015 | George | E21C 35/18 148/334 |
| 2017/0103506 A1* | 4/2017 | Dandibhotla | G06V 10/758 |
| 2017/0287124 A1* | 10/2017 | Lim | G06T 7/74 |
| 2018/0304271 A1* | 10/2018 | Bojinescu | B02C 4/286 |
| 2021/0009359 A1* | 1/2021 | Polak | G06T 7/11 |
| 2021/0079303 A1* | 3/2021 | Wu | C10G 1/04 |
| 2021/0262204 A1* | 8/2021 | Tafazoli Bilandi | G06N 3/0454 |

OTHER PUBLICATIONS

Gul, M., Catbas, F. N., & Hattori, H. (2015). "Image-Based Monitoring of Open Gears of Movable Bridges for Condition Assessment and Maintenance Decision Making". Journal of Computing in Civil Engineering, 04014034. doi: 10.1061/(asce)cp. 1943-5487. 0000307.

M. Stokkeland, "A computer vision approach for autonomous wind turbine inspection using a multicopter", 2014.

Ge, D. Y., Yao, X. F., Lian, Z. T., Wang, H. Z., & Tao, T. (2017). Applications of computer vision in measuring total cumulative pitch deviation of a gear. Tehnički vjesnik, 24(1), 71-78.

Kerr, David, James Pengilley, and Robert Garwood. "Assessment and visualisation of machine tool wear using computer vision." The International Journal of Advanced Manufacturing Technology 28.7-8 (2006): 781-791.

Gadelmawla, E. S. "Computer vision algorithms for measurement and inspection of spur gears." Measurement 44.9 (2011): 1669-1678.

Klancnik, S., et al. "Computer vision-based approach to end mill tool monitoring." International Journal of Simulation Modelling 14.4 (2015): 571-583 http://www.ijsimm.com/Full_Papers/Fulltext2015/text14-4_571-583.pdf.

Robinson, M. J., J. P. Oakley, and M. J. Cunningham. "The accuracy of image analysis methods in spur gear metrology." Measurement Science and Technology 6.7 (1995): 860.

* cited by examiner

MONITORING WEAR OF DOUBLE ROLL CRUSHER TEETH BY DIGITAL VIDEO PROCESSING

FIELD OF THE INVENTION

The present invention relates to computer-implemented methods, systems, and computer program products for monitoring wear of double roll crusher teeth by computer vision techniques.

BACKGROUND OF THE INVENTION

Double roll crushers are used to crush mined oil sand ore to a suitable size for slurry preparation as a preliminary step in hot water extraction processes. A double roll crusher includes a pair of opposed cylindrical drums having teeth that project from the drum surfaces.

Feed material placed onto the drums is crushed between the teeth as the drums rotate in opposite directions. Wear or damage to the teeth compromises crushing performance, and increases the likelihood of damage to the drum.

Manual inspection of the teeth may be carried out with a view to preventative maintenance. Manual inspection involves stopping rotation of the drums, cleaning the crusher teeth, and manually measuring the teeth. For a large-sized roller with hundreds of teeth, a manual inspection can take several hours to perform.

Over-frequent inspection results in excessive loss productivity, while under-frequent inspection allows for excessive wear and damage. As such, it would be desirable to be able to assess the degree of wear of the teeth to help decide whether a manual inspection is warranted.

The prior art includes computer vision-based technologies for detecting a damaged or missing machine part, including in particular a shovel tooth: see U.S. patent application publication no. US 2010/0142759 A1 (Ridley et al.; 2010-06-10); U.S. patent application no. US 2015/0085123 A1 (Tafazoli Bilandi et al; 2015-03-26) and U.S. patent application publication no. US2017287124 A1 (Lim et al.). These technologies involve comparing captured digital images of the shovel tooth (or digital images derived from such images) with a template or model of the expected shape of the shovel tooth. This approach requires differentiating between portions of the digital image showing the shovel tooth and its background. In some cases, this depends on detection of apparent movement between the shovel tooth and its background in time-sequenced images.

This approach is difficult to implement for monitoring wear of double roll crusher teeth. Unlike a shovel tooth that contrasts well with a background of sky or ground surface, the double roll crusher teeth and the double roll crusher drum typically have the same or similar surface finish. Further, the teeth and drum may be fouled with feed material. Further still, the teeth and the drum move in unison, which prevents use of approaches that depend on detection of apparent movement between a machine part and its background.

Accordingly, a need remains for a technological solution to monitoring wear of double roll crusher teeth. Preferably, the technology provides reliable quantitative monitoring of the sizes or shapes of the double roll crusher teeth, to assess whether a manual inspection is warranted. Preferably, the technology can be used while the drums of the double roll crusher are rotating. Preferably, the technology can be used when the drums and teeth are fouled with feed material such as mined oil sand ore. Preferably, the technology can be adapted to a variety of different configurations of teeth, without the need for predetermined models or templates of teeth configurations. Preferably, the technology is computationally efficient and practical to implement.

SUMMARY OF THE INVENTION

A method for monitoring wear of teeth of a drum of a double roll crusher, the method implemented by a processor and comprising the steps of:
  (a) receiving a digital video capturing rotation of the drum and the teeth;
  (b) for each frame of the digital video, segmenting the frame into groups of contiguous pixels, wherein each group is representative of one of the teeth;
  (c) determining a parameter indicative of a geometry at least one of the teeth based on at least one of the segmented groups of contiguous pixels in at least one of the frames of the digital video; and
  (d) generating a human-readable report based on the parameter indicative of the geometry of the at least one of the teeth.

In one embodiment of the method, the method further comprises, before the segmenting step (b), defining a region of interest in the frame by using an image processing technique, such as optical flow, to identify pixels representative of the drum and the teeth, and wherein the segmenting step (b) is performed only on the region of interest in the frame.

In one embodiment of the method, the method further comprises, before the segmenting step (b), enhancing contrast of the frame.

In one embodiment of the method:
  (a) the method further comprises, after the segmenting step (b) and before the determining step (c), for each group of contiguous pixels, determining pixel coordinates of a minimum bounding region of the group of contiguous pixels; and
  (b) inclusion of any one of the minimum bounding regions in the determining step (c) is conditional upon either one or both of:
    (i) the one of the minimum bounding regions having a pixel dimension equal to or greater than a pre-determined minimum pixel dimension; or
    (ii) the one of the minimum bounding regions being tracked through a pre-determined minimum number of successive frames of the digital video.

In embodiments of the method which include determining pixel coordinates of the minimum bounding region of the group of contiguous pixels, the method may further comprise determining an estimate of the position of the at least one of the teeth based on the pixel coordinates of one of the minimum bounding regions in at least one of the frames of the digital video, and wherein the report is further based on the estimate of the position of the at least one of the teeth. Determining the estimate of the position of the at least one of the teeth may be based on a modal pixel coordinate of the pixel coordinates of the minimum bounding regions in a plurality of the frames of the digital video.

In embodiments of the method which include determining pixel coordinates of the minimum bounding region of the group of contiguous pixels, the determining step (c) may be based on a statistical measure of a plurality of estimates of the dimension of the at least one of the teeth, determined based on the pixel coordinates of at least one of the minimum bounding regions in a plurality of the frames of the digital video. The plurality of the frames of the digital video may capture a single rotation of the drum, or a plurality of rotations of the drum.

In embodiments of the method, the parameter may be one or a combination of a pixel length, a pixel area, or a shape factor, based on at least one of the segmented groups of continuous pixels.

In another aspect, the present invention comprises a system comprising a processor operatively connected to a non-transitory tangible medium storing a set of instructions executable by the processor to implement one or a combination of the embodiments of the method of the present invention, as described above.

In another aspect, the present invention comprises a computer program product comprising a non-transitory tangible medium storing a set of instructions executable by a processor to implement one or a combination of the embodiments of the method of the present invention, as described above.

BRIEF DESCRIPTION OF THE DRAWINGS

In the drawings shown in the specification, like elements may be assigned like reference numerals. The drawings are not necessarily to scale, with the emphasis instead placed upon the principles of the present invention. Additionally, each of the embodiments depicted are but one of a number of possible arrangements utilizing the fundamental concepts of the present invention.

FIGS. 6A to 6D show processing of a digital video frame to determine a region of interest that excludes at least some of the pixels that do not represent the drums or teeth of the double roll crusher, as may be implemented in an embodiment of the method of the present invention.

FIGS. 7A to 7B show processing of a digital video frame to enhance contrast thereof, as may be implemented in an embodiment of the method of the present invention.

FIGS. 8A to 8B show processing of a digital video frame to segment the frame into groups of pixels representative of teeth.

DETAILED DESCRIPTION OF EMBODIMENTS OF THE INVENTION

Definitions.

Any term or expression not expressly defined herein shall have its commonly accepted definition understood by a person skilled in the art. As used herein, the following terms have the following meanings.

"Contrast enhancement" refers to a method for increasing the contrast of a digital image by increasing or "stretching" the unprocessed range of pixel intensity values to a larger range of pixel intensity values, and "scaling" or "mapping" the unprocessed pixel intensity values to the larger range of pixel intensity values in accordance with an algorithm. Non-limiting examples of contrast enhancement algorithms include linear and non-linear contrast stretching, histogram equalization, and homomorphic filtering. Contrast enhancement may be performed in accordance with a variety of algorithms, which are known to persons skilled in the art of digital image processing, and which do not by themselves constitute the present invention.

"Digital image" refers to data stored in a memory or transmittable in a data signal that provides a representation of an image as a two-dimensional array of pixels. As known to persons skilled in the art of digital image processing, each pixel is associated with a numerical value that represents the color of the pixel. Digital image data may be stored in a variety of known file formats including, without limitation, BMP, JPEG, PNG, RAW, or TIFF.

"Digital video" refers to a time-sequenced series of digital images, each of which is referred to as a "frame". Digital video data may be stored in a variety of known file formats including, without limitation, Audio Video Interleave (AVI), Flash Video (FLV), MPEG (MPG), QuickTime (MOV), and Windows Media Video (WMV).

"Digital video camera" refers to any electronic device capable of capturing digital video.

"Display device" refers to any electronic device capable of displaying a signal from a processor in human readable form. Non-limiting examples of display devices include LED (light emitting diode), LCD (liquid-crystal display), or CRT (cathode ray tube) video displays.

"Memory" refers to a non-transitory tangible medium for storing information in a format readable by a processor, and/or instructions readable by a processor to implement an algorithm. Non-limiting types of memory include solid-state, optical, and magnetic computer readable media.

"Optical flow" (also known as "optic flow") refers to a method for detecting the apparent movement of a visual element between successive frames of a digital video. In general, optical flow involves determining a displacement vector for a particular pixel in one frame of a digital video to represent its apparent change of position in a successive frame of the digital video. Optical flow may be performed in accordance with a variety of algorithms, which are known to persons skilled in the art of digital image processing, and which do not by themselves constitute the present invention.

"Processor" refers to one or more electronic devices that is/are capable of reading and executing instructions stored on a memory to perform operations on data, which may be stored on a memory or provided in a data signal. Non-limiting examples of processors include devices referred to as microprocessors, microcontrollers, central processing units (CPU), and digital signal processors.

"Quantitative relationship" refers to a relationship, which can be used by a processor, to determine a numerical value of a variable based on a numerical value of at least one other variable. Non-limiting forms of quantitative relationships include a mathematical function, a data point set (e.g., in the form of a lookup table or associative array), or a best-fit curve applied to a data point set. Irrespective of the form of the quantitative relationship, a quantitative relationship to determine the numeric value of a variable, $\beta$, based on numerical values of variables $(\alpha_1, \alpha_2, \ldots \alpha_n)$, may be symbolically represented herein by the notation: $\beta = f(\alpha_1, \alpha_2, \ldots \alpha_n)$. The present invention is not limited by the manner in which a quantitative relationship is determined. For example, a quantitative relationship may be based on either one or a combination of a rational model according to theory, and empirical data.

"Tracking" refers to a method for locating a target object in successive digital video frames. In general, tracking involves analysis of successive digital video frames to determine the movement of a target object between the frames. Tracking may be performed in accordance with a variety of algorithms, which are known to persons skilled in the art of digital image processing, and which do not by themselves constitute the present invention.

"Segmentation" refers to a method for partitioning a digital image into groups of pixels representing one or more discrete objects. In general, segmentation involves assigning a common label or classification to pixels sharing one or more common characteristic, such as color, luminous intensity, or perceived texture. Segmentation may be performed in accordance with a variety of algorithms (e.g., thresholding methods, clustering methods, statistical-based methods, or trainable machine learning methods implementing artificial neural networks), which are known to persons skilled in the art of digital image processing, and which do not by themselves constitute the present invention.

"Shape factor" refers to a dimensionless quantity used to numerically describe the shape of an object. A non-limiting example of a shape factor is an aspect ratio (i.e., a ratio of the objects maximum dimension to its minimum dimension, or vice versa). Another non-limiting example of a shape factor is its circularity factor indicative of the similarity of the shape of the object to a circular shape (e.g., this may be expressed as $4\pi A/P^2$, where A is the area of the object, and P is the perimeter of the object).

"Thresholding" refers to a method of converting pixels of a digital image from an original color value or luminous intensity to one of a limited set of possible color values or luminous intensities (e.g., black or white), depending on whether the original color or luminous intensity is less than or greater than a threshold value. Thresholding may be performed in accordance with a variety of algorithms, which are known to persons skilled in the art of digital image processing, and which do not by themselves constitute the present invention.

System.

Figure 1:
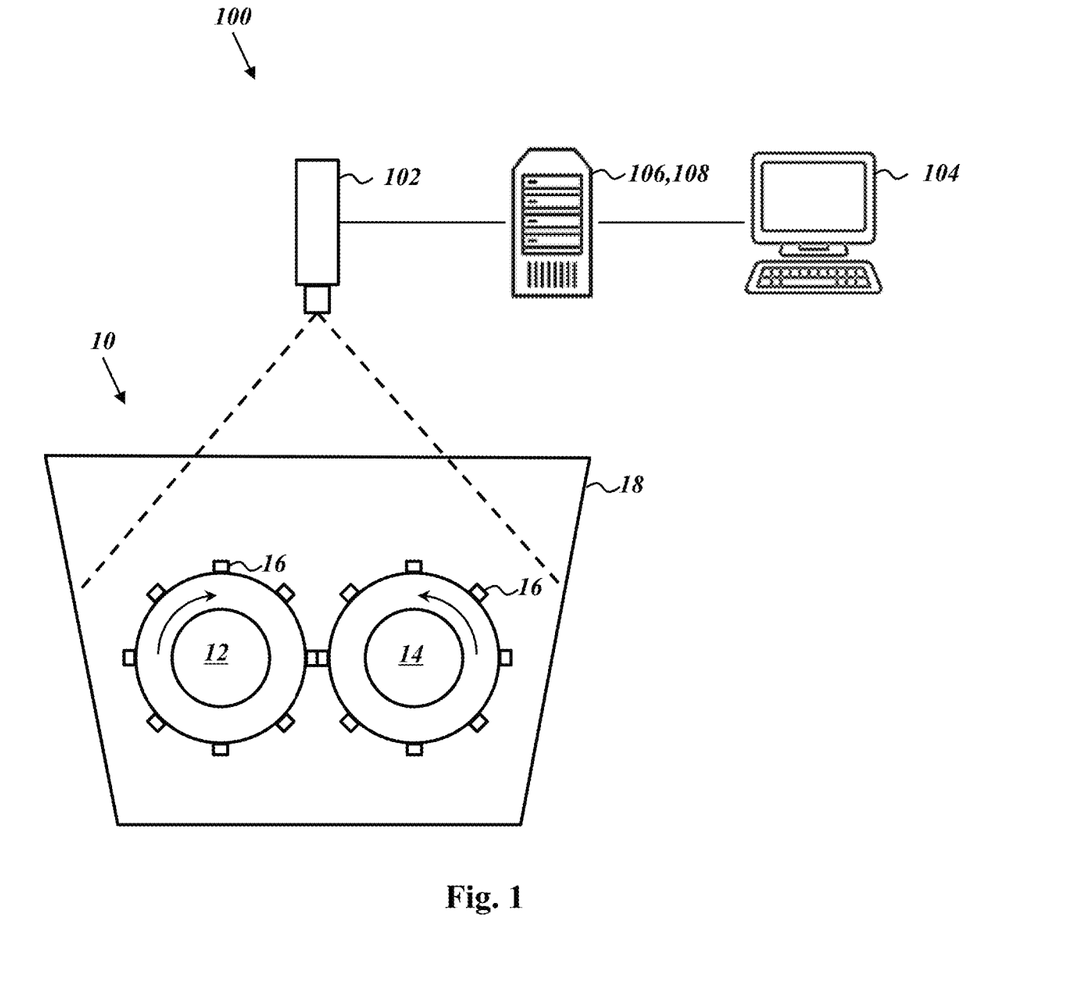
FIG. 1 shows an embodiment of a system of the present invention for monitoring wear of double roll crusher teeth.

FIG. 1 shows a double roll crusher (10) as known in the art, and a system (100) of the present invention for estimating a dimension of the teeth of the double roll crusher (10).

In this embodiment, the double roll crusher (10) is used to crush a feed material including mined oil sand ore, but the system (100) is not limited by any particular use, size, or configuration of the double roll crusher (10). The double roll crusher (10) includes a pair of opposed cylindrical drums (12, 14) having teeth (16) that project from the surface of the drums (12, 14), all of which are located in a chute (18). In one embodiment, the teeth (16) are arranged in a plurality of "columns" that run circumferentially on the surface of the drums (12, 14), with the teeth (16) of adjacent "columns" being circumferentially offset from each other. Feed material placed into the chute (18) is crushed between the drums (12, 14) and their teeth (16), as the drums (12, 14) rotate in opposite directions as indicated by the curved arrows.

In this embodiment, the system (100) includes a digital video camera (102), a display device (104), a processor (106), and a memory (108), which are subsequently described in further detail. The lines between the components of the system (100) show operative connections permitting data communication between them, whether such connections are in the form of a wired or wireless data signals (e.g., hardwired connections, a local area network, the Internet), or via memory devices (e.g., a memory card). The present invention is not limited by the manner in which the components of the system (100) are operatively connected. In one embodiment, the digital video camera (102), the processor (106), the memory (108), and the display device (104), may be physically integrated on a single device such as a mobile computer in the form of a tablet computer or a smartphone. In alternative embodiments, one or more of the digital video camera (102), the display device (104), the processor (106), and the memory (108), and may be physically discrete devices, which may be situated either proximal to or remotely from the double roll crusher (10). For example, the digital video camera (102) and the display device (104) may be separate from and in communication with the processor (106) and the memory (108) in a client server-relationship.

Digital Video Camera.

A purpose of the digital video camera (102) is to capture digital video of the drums (12, 14) and teeth (16) of the double roll crusher (10) as the drums (12, 14) are rotating.

The digital video camera (102) may be a handheld mobile camera, a mobile camera removably mounted to a support such as a tripod, or permanently installed in proximity to the double roll crusher (10). A mobile digital video camera (102) may allow the system (100) to be readily deployed at different locations, with relatively lower infrastructure costs and maintenance requirements. In comparison, a permanently installed camera may allow for a more consistent and controlled field of view of the drums (12, 14) and teeth (16), which may reduce the computation expense of the method of the present invention. In any case, the digital video camera (102) is preferably isolated as much as possible from any vibratory effect of the double roll crusher (10). Also, lighting may be needed to illuminate the drums (12, 14) of the double roll crusher (10) if daylight is inadequate to produce a sufficiently clear digital video.

The present invention is not limited by any particular specification of the digital video camera (102). However, the present invention is facilitated by a digital video camera (102) having a lens and image sensor that can produce clear digital images under a range of lighting conditions, and that can record at a high frame rate and high resolution suitable for processing as subsequently described in further detail. As a non-limiting example, a suitable digital video camera (102) is a camera of an iPhone 6™ smartphone (Apple Inc., Cupertino, Calif., USA), which is capable of recording digital video at 240 frames per second (FPS), in 780p format with a resolution of 1280×780 pixels.

Display Device.

A purpose of the display device (104) is to receive data signals from the processor (106), and display the data signal in a human-readable format. In particular, the display device (104) is used to display reports generated by the processor (106) implementing a method of the present invention.

The present invention is not limited by any particular type of display device (104). In one embodiment as shown in FIG. 1, the display device (104) is a standalone computer monitor.

In other embodiments, the display device (104) is a screen of a mobile computer such as a tablet computer of a smartphone.

Processor and Memory.

A purpose of the processor (106) is to implement a set of instructions stored on the memory (108) to carry out a method of the present invention for monitoring wear of the double roll crusher teeth. In one embodiment, this monitoring includes estimating a dimension of the roll crusher teeth, as subsequently described in further detail. The estimated dimension may include a linear measurement of the teeth (e.g., their length or width), or an area measurement of the teeth (e.g., the crushing surface of the tooth). In another embodiment, this monitoring may additionally or alternatively include identifying a shape, or change in shape of the teeth (e.g., a rounding of the edges or corners of the teeth, indicative of initial wear of the teeth).

The present invention is not limited by any particular type of processor (106) and memory (108). In one embodiment, the processor (106) and the memory (108) may be provided by a laptop or desktop general-purpose desktop computer including a processor (106) in the form of a CPU chip operatively connected to a memory (108) in the form of a hard drive disk, and running on an operating system such as Windows™ (Microsoft Corporation; Redmond, Wash., USA) or macOS™ (Apple Inc., Cupertino, Calif., USA).

Figure 2:
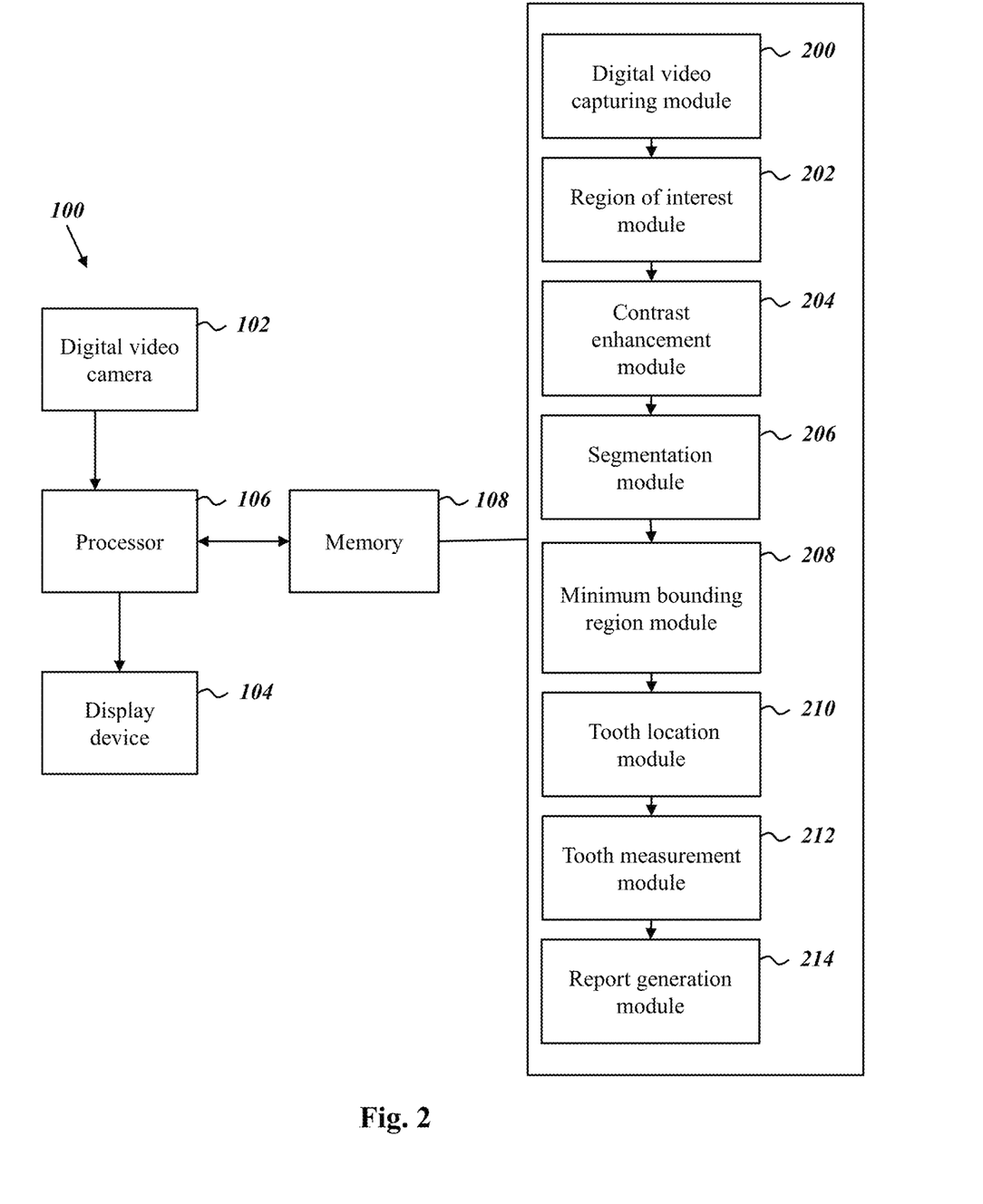
FIG. 2 shows a block diagram of the system of the system of FIG. 1.

As shown in FIG. 2, the set of instructions stored by the memory (108) may be conceptualized as a set of modules (202 to 214), each of which represents part of the set of instructions that enable specific functions of the system (100). The memory (108) storing the set of instructions (200) may, by itself, form a computer-program product of the present invention.

Method.

Figure 3:
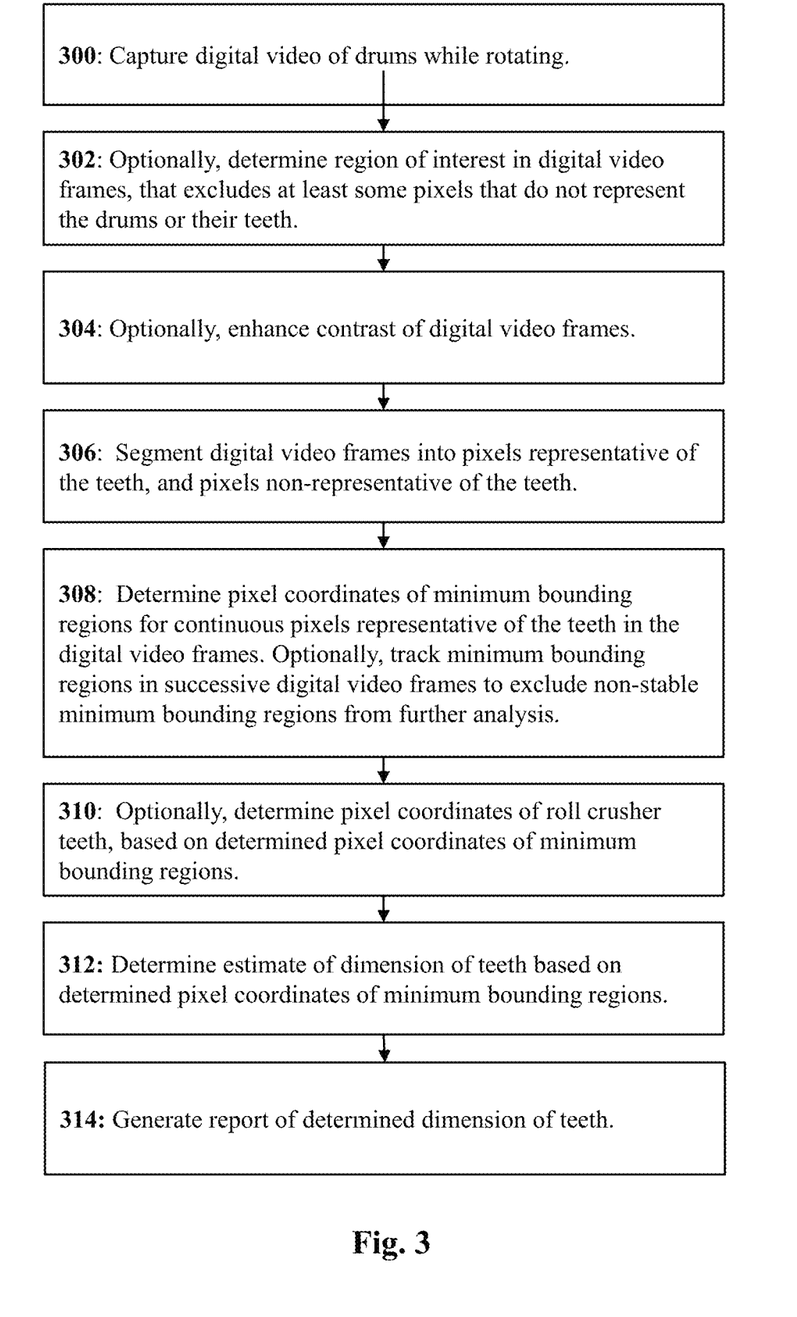
FIG. 3 shows a flow chart of steps in an embodiment of a method of the present invention for monitoring wear of double roll crusher teeth.

FIG. 3 shows a flow chart of steps in an embodiment of a method of the present invention for monitoring wear of double roll crusher teeth, as may be implemented by the system (100) of the present invention.

Step 300: Capture digital video of drums while rotating.

At step 300, the method begins with using the digital video camera (102) to capture digital video of the drums (12, 14) of the double roll crusher (10) while rotating. The digital video may capture both of the drums (12, 14) for monitoring wear of teeth (16) on both drums (12, 14) at the same time. Alternatively, the digital video may capture only one of the drums (12, 14) for monitoring wear of teeth (16) only on that one drum (12, 14).

Figure 4:
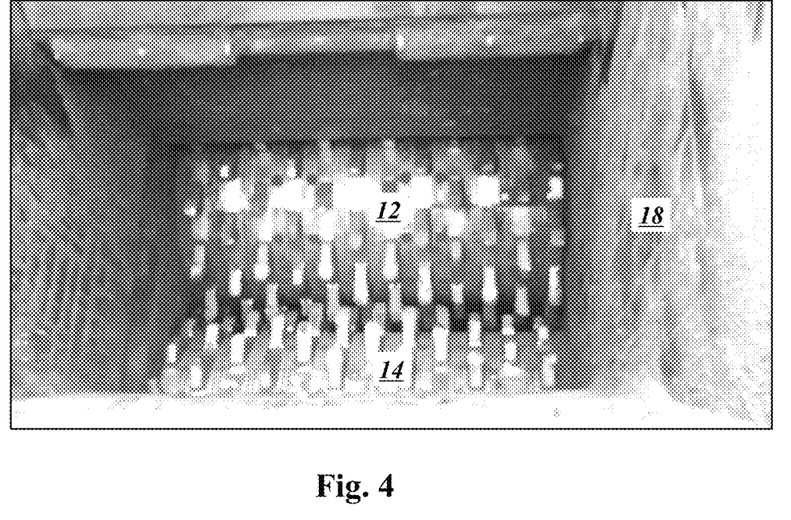
FIG. 4 is an exemplary digital video frame showing a clean double roll crusher drum, as captured in an embodiment of a method of the present invention.
Figure 5:
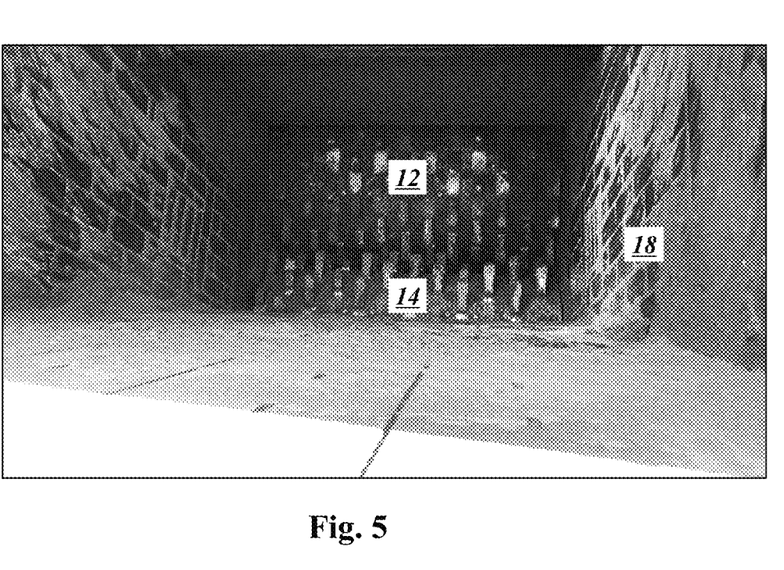
FIG. 5 is an exemplary digital video frame showing a double roll crusher drum fouled with mined oil sand ore, as captured in an embodiment of a method of the present invention.

FIG. 4 shows an example of a captured digital video frame of the drums (12, 14) in a relatively clean state free of feed material. FIG. 5 shows an example of a captured digital video frame of the drums (12, 14) and teeth (16) fouled with feed material in the form of mined oil sands ore. As can be seen, the delineation of the teeth (16) is somewhat less clear in FIG. 5 than in FIG. 4. Further, the appearance of the drums (12, 14) and teeth (16) can be more variable when fouled such as shown in FIG. 5, than when cleaned in FIG. 4. Accordingly, cleaning the drums (12, 14) before capturing the digital video may help improve the reliability of results produced by the method. However, this is not strictly necessary, as embodiments of the method may produce acceptably reliable results even when the drums (12, 14) are fouled as shown in FIG. 5.

Preferably, the flow of feed material to the double roll crusher (10) is stopped during the duration of the digital video recording, so that the feed material does not interfere with a clear view of the drums (12, 14) and their teeth (16). In one embodiment, a digital video capturing module (200) activates the digital video camera (102) to capture digital video only when flow of feed material to the double roll crusher (10) ceases. For example, the digital video capturing module (200) may interface with a switch for an apron feeder (not shown) that delivers material to the double roll crusher (10), such that switching off the apron feeder initiates recording by the digital video camera (102). In another embodiment, the digital video capturing module (200) may detect when feed ceases by digital image analysis, and initiate subsequent steps of the method only conditionally upon such detection. In yet another embodiment of the method, a human operator may manually operate the digital video camera (102) only when the flow of feed material to the double roll crusher (10) has ceased.

As noted, the digital video is captured while the drums (12, 14) are rotating. Preferably, the drums (12, 14) are rotating at a known constant speed. Preferably, the duration of the captured digital video is sufficient to capture multiple rotations of the drums (12, 14). For example, in one embodiment of the method, the drums (12, 14) rotate at about 55 revolutions per minute (RPM), and the captured digital video is about 22 seconds in duration so as to capture about 20 rotations of the drums (12, 14). Preferably, the frame rate of the digital video is sufficiently high such that, during each rotation, a particular tooth (16) is visible in multiple frames. For example, in one embodiment of the method, the captured digital video has a frame rate of 240 (FPS) such that any particular tooth (16) is visible in more than 20 frames for each rotation of the drums (12, 14).

Optional step 302: Determine region of interest in digital video frames, that excludes at least some pixels that do not represent the drums or their teeth.

Figure 6A:
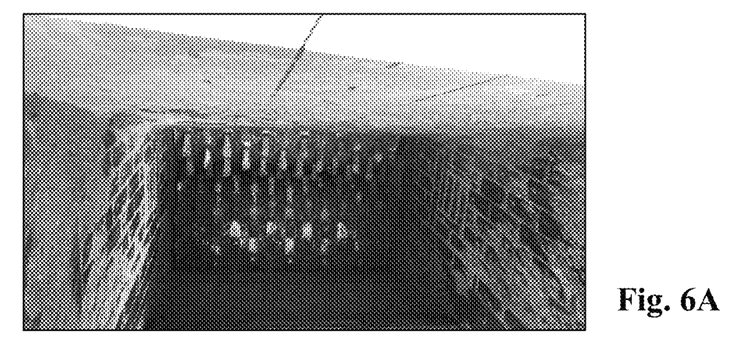
FIG. 6A shows the digital video frame before processing.

FIG. 6A shows an example of a captured digital video frame that includes pixels representing the drums (12, 14) and other pixels representing the surrounding chute (18) of the double roll crusher (10). The pixels representing the chute (18) are not relevant to estimating the dimension of the teeth (16), but their presence increases the computational expense of the method. Therefore, it may be desirable to limit field of view of the digital video camera (102) as much as possible to only the drums (12, 14). However, this may not always be possible. For example, if an operator uses a handheld digital video camera (102) to capture the digital video, then unavoidable hand movements of the operator may result in the field of view inadvertently capturing portions of the chute (18). It would be desirable to make the method more convenient and robust to handle such digital video as input, without the need for human-directed preprocessing of the digital video.

Accordingly, in optional step (302) (performed in accordance with the instructions of the region of interest module (202)), the method continues by defining region of interest in the digital video frames that excludes at least some of the pixels that do not represent the drums (12, 14) or their teeth (16).

Figure 6B:
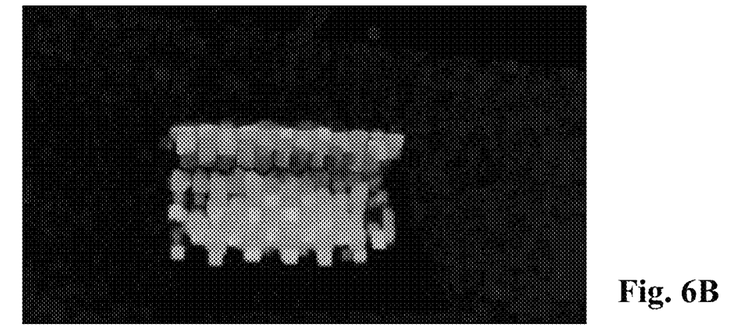
FIG. 6B shows the digital video frame of FIG. 6A after optical flow processing.

In one embodiment, step (302) begins by using an optical flow algorithm to process the digital video frames. The optical flow algorithm exploits the rotating movement of the drums (12, 14) to detect the magnitude and direction of apparent movement of their representative pixels, in contrast to the apparently stationary pixels representative of the chute (18). FIG. 6B shows the digital video frame of FIG. 6A after optical flow processing. FIG. 6B is actually generated in RGB color. The pixels representing drum (12) and its teeth (166) are shown by a common color (e.g., purple) on account of these pixels having apparent movement between successive digital video frames in a common first direction, on account of rotational movement of the drum (12). The pixels representing the drum (14) and its teeth (16) are shown by a different common color (e.g., green) on account of these pixels having apparent movement between successive digital video frames in a common second direction opposite to the first direction, on account of rotational movement of the drum (14) in the direction opposite to rotational movement of the drum (12). The pixels representing the chute (18) are shown substantially in black or very dark gray, on account of these pixels having virtually no apparent movement between successive digital video frames, other than that due to inadvertent movement or vibration of the digital video camera (102).

Figure 6C:
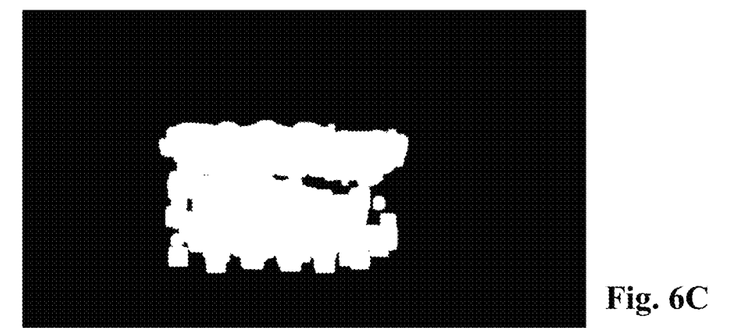
FIG. 6C shows the digital video frame of FIG. 6B after threshold processing.

In one embodiment, step (302) further processes the digital video frames by using a thresholding algorithm. FIG. 6C shows the digital video frame of FIG. 6B after threshold processing. The purple and green pixels representing the drum (12, 14) and their teeth (16) in FIG. 6B have a luminous intensity greater than a predetermined threshold intensity, and are therefore converted to white color in FIG. 6C. The black pixels representing the chute (18) in FIG. 6B have a luminous intensity less than the predetermined image intensity, and are therefore "converted" to black color in FIG. 6C.

Figure 6D:
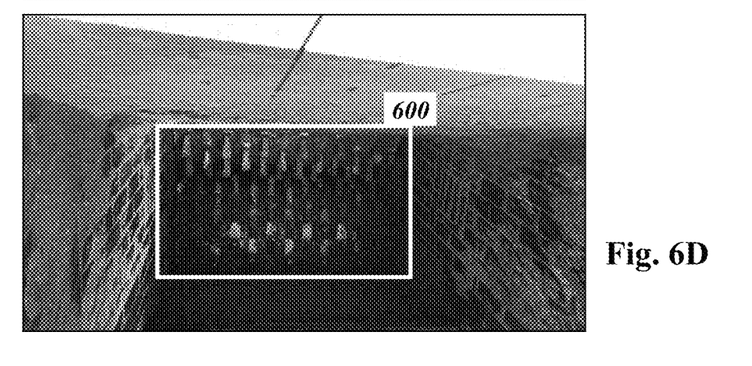
FIG. 6D shows the digital video frame of FIG. 6A with a defined region of interest.

In one embodiment, step (302) continues by determining the coordinates of a notional minimum bounding box that encloses the pixels that represent the drums (12, 14) and their teeth (16). These coordinates can be determined as the minimum and maximum "x, y" pixel coordinates of the white pixels that result from thresholding of the digital video frames. As shown in FIG. 6D, the minimum bounding box delimits a rectangular region (600) of pixels that are subject to further processing by the method, while pixels outside of the rectangular region (600) are effectively cropped away and excluded from further processing to reduce the computational expense of the method.

Optional step 304: Enhance contrast of digital video frames.

Figure 7A:
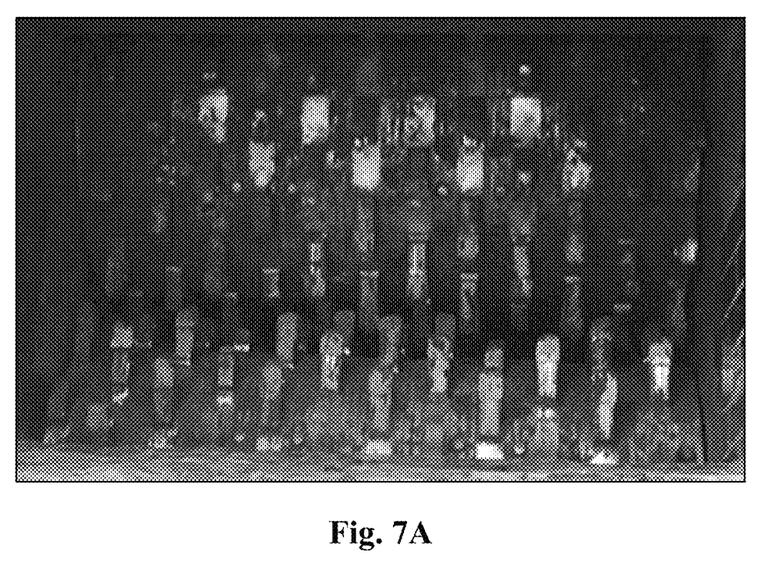
FIG. 7A shows the digital video frame prior to contrast enhancement.

FIG. 7A shows an example of a digital video frame limited to a region of interest as determined in accordance with step (302). In general, the luminous intensity of the pixels representative of the teeth (16) are higher (i.e., they correspond to white or relatively light colors), than the luminous intensity of the pixels representative of the drums (12, 14) (i.e., they correspond to black or relatively darker colors). Nonetheless, the luminous intensity of some pixels representative of the teeth (16) may be similar to the luminous intensity of some pixels representative of the drums (12, 14), particularly when the drums (12, 14) and teeth (16) are fouled with mined oil sand ore. As further described below, a subsequent step (306) of the method involves segmenting the digital video frames into pixels representing the drums (12, 14) as opposed to their teeth (16). That segmentation is facilitated by higher contrast between the pixels representing the drums (12, 14) as opposed to their teeth (16).

Figure 7B:
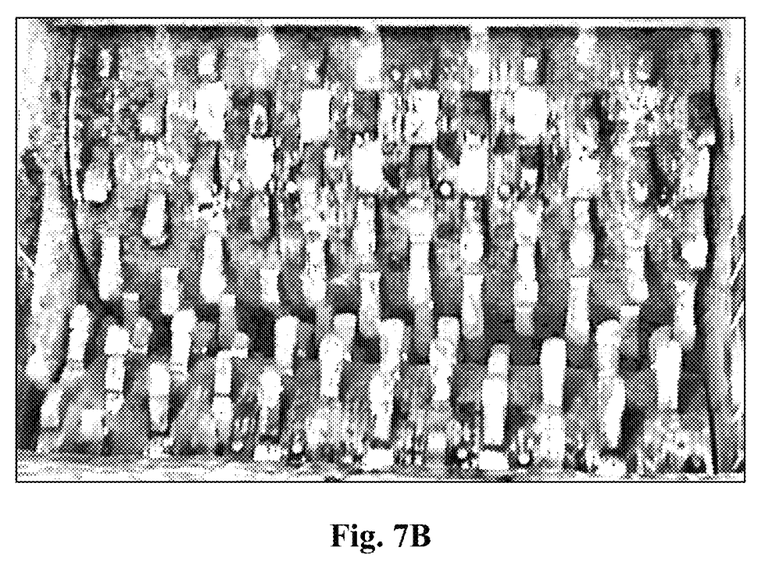
FIG. 7B shows the digital video frame of FIG. 7A after contrast enhancement.

Accordingly, in optional step (304) (performed in accordance with the instructions of the contrast enhancement module (204)), the method continues by enhancing the contrast of the digital video frames to facilitate the subsequent segmentation step (306). FIG. 7B shows the digital video frame of FIG. 7A after contrast enhancement by a "contrast limited adaptive histogram equalization" (CLAHE) algorithm.

The present invention is not limited by any particular contrast enhancement algorithm. A non-limiting example of suitable contrast enhancement algorithm is histogram equalization, more particularly adaptive histogram equalization, and even more particularly CLAHE. Such algorithms are known to persons skilled in the art of digital image processing, and do not by themselves form part of the claimed invention. In contrast to ordinary histogram equalization, adaptive histogram involves computing several histograms, each of which corresponds to a distinct section of the digital image. This is useful for equalizing the contrast even if an image has uneven lighting. However, adaptive histogram equalization tends to over amplify noise in relatively homogeneous regions of a digital image. CLAHE is an improved variant of adaptive histogram equalization that limits the degree of amplification.

Step 306: Segment digital video frames into contiguous groups of pixels representing the teeth.

Figure 8A:
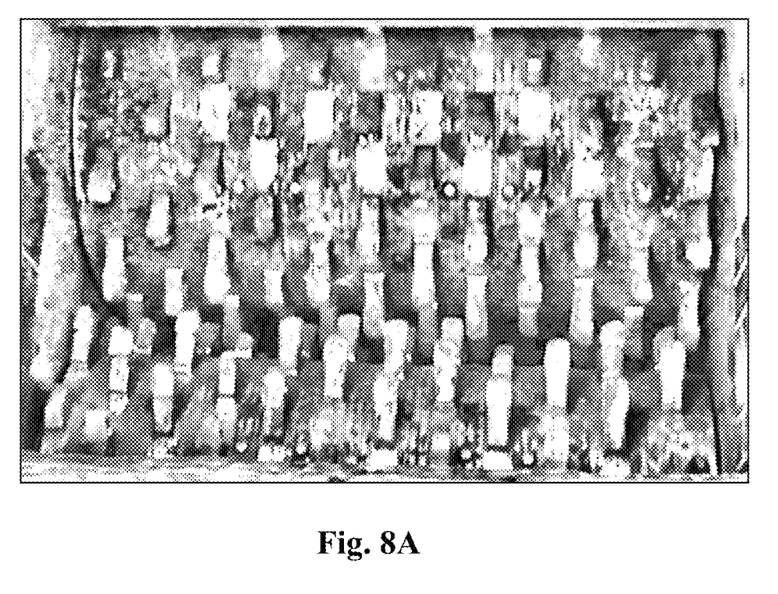
FIG. 8A shows the digital video frame prior to segmentation processing.

FIG. 8A shows an example of a digital video frame after contrast enhancement, as performed in accordance with step (304). As noted, the luminous intensity of the pixels representative of the teeth (16) are generally higher, than the luminous intensity of the pixels representative of the drums (12, 14). The difference in luminous intensity provides a basis for segmenting the digital video frame.

In step (306) (performed in accordance with the instructions of the segmentation module (206)), the method continues by segmenting the digital video frames into groups of contiguous pixels representing the teeth (16), as opposed to the drums (12, 14).

The present invention is not limited by any particular segmentation algorithm. A non-limiting example of suitable segmentation algorithm involves global thresholding. Such algorithms are known to persons skilled in the art of digital image processing, and do not by themselves form part of the claimed invention. In one embodiment, the global thresholding algorithm converts pixels having a luminous intensity greater than a single threshold value in FIG. 8A to white pixels in FIG. 8B, and converts pixels having a luminous intensity less than the single threshold value in FIG. 8A to black pixels in FIG. 8B. Once the digital video frame has been subjected to thresholding, the pixels can be classified into one of two object classes: white pixels are classified as "teeth"; and black pixels are classified as "non-teeth" (e.g., the drum or the chute). Other thresholding techniques may be used, but a simple global thresholding technique was found to be effective when the digital video frames were contrast enhanced by histogram equalization, as described above in step (304).

Step 308: Determine coordinates of minimum bounding regions for contiguous groups of pixels representative of the teeth, and track the minimum bonding boxes through multiple frames.

After step (306), the digital video frames are segmented into groups of pixels representative of the teeth (16). Although this may be sufficient to detect the presence of the teeth (16), it may remain difficult to estimate their positions and dimensions particularly when the teeth (16) are fouled with mined oil sands ore.

Figure 9:
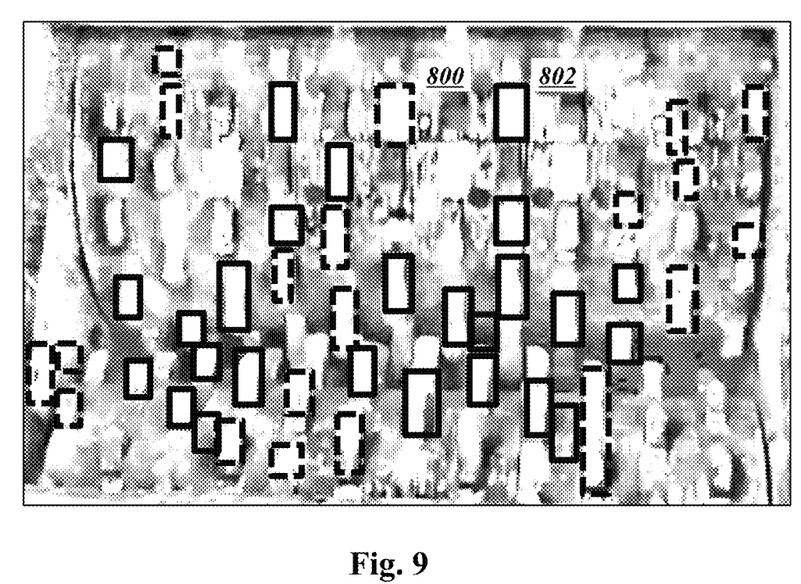
FIG. 9 shows minimum bounding boxes fitted to groups of pixels representative of teeth in a digital video frame, as may be determined in an embodiment of the method of the present invention.

Accordingly, in step (308) (performed in accordance with the instructions of the minimum bounding region module (208)), the method continues by determining the coordinates of notional minimum bounding regions that enclose groups of contiguous white pixels. In embodiments of the method, minimum bounding regions may have different shapes suited to the shape of the teeth (16). In the embodiment shown in FIG. 9, the teeth (16) of the double roll crusher (10) have a substantially rectangular shape, and as such, a suitable shape of the minimum bounding regions are rectangular minimum bounding boxes. Their coordinates can be determined as the minimum and maximum "(x, y)" pixel coordinates of groups of contiguous groups of white pixels resulting from segmentation step (306) as described above. As shown in FIG. 9, these determined coordinates delimit a plurality of rectangular regions, two of which are labelled as box (800) and box (802).

Figure 8B:
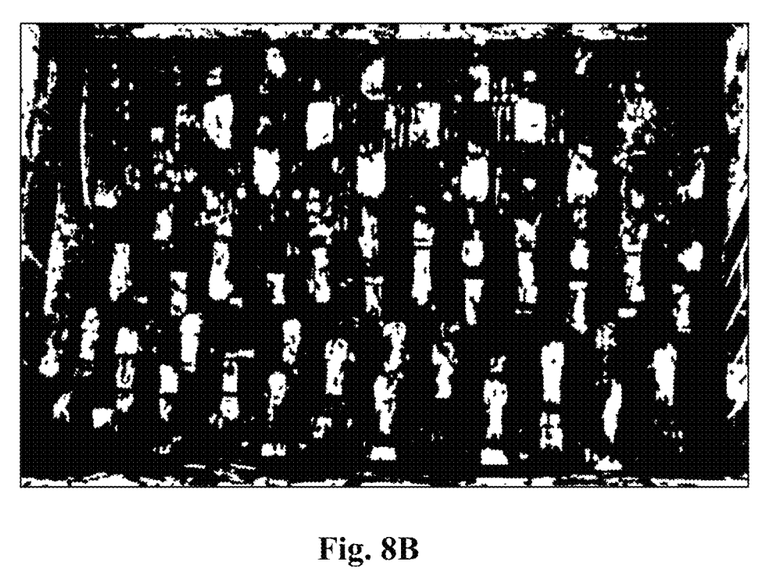
FIG. 8B shows the digital video frame after segmentation processing.

As noted, the delineation between the drums (12, 14) and their teeth (16), may be obscured by the presence of mined oil sand ore on their surfaces, and other phenomena such as transient light reflections off of the drums (12, 14), the teeth (16), and the mined oil sand ore. These phenomena create "noise" or anomalous visual artifacts that may result in false detection of teeth, or compromise the reliability of the subsequent estimate of teeth dimensions. For example, as seen in FIG. 8B, there are number of sliver-shaped white regions, which would result in unreliable estimates of the tooth size if they were included in the analysis.

Accordingly, in one embodiment, the inclusion of any minimum bounding region in the subsequent analysis may be subject to either one or both of the following conditions. A first condition is that the minimum bounding region must be larger than a predetermined minimum pixel dimension, in order for that minimum bounding box to be considered for further analysis. To explain, each tooth (16) is expected to be larger than a predetermined threshold minimum dimension, despite reasonably anticipated effects of wear or damage. Therefore, any minimum bounding region that represents the entirety of a tooth (16) is also expected to be larger than a corresponding predetermined threshold minimum pixel dimension, assuming that the digital video is captured within a certain range of scale.

A second condition is that the minimum bounding region must be trackable through a predetermined minimum number of successive frames, in order for that minimum bounding region to be considered for further analysis. This ensures that the minimum bounding box encloses a group of pixels that provides a "stable" representation of one of the teeth (16), rather than transient noise or visual artifacts. In general, increasing the minimum number of successive frames increases the reliability of the results of the method, but setting the minimum number of frames too high may prevent the method from producing sufficient results. As a non-limiting example, a suitable number for the minimum number of successive frames may be 20 frames. FIG. 9 shows the tracking of minimum bounding boxes. Each of the minimum bounding boxes shown in dotted outline (e.g., box (800)) has been identified, but not yet tracked through 20 successive frames. This box (800) is therefore not included in the further analysis, unless it continues to be tracked in successive frames for a cumulative 20 frames. In contrast, each of the minimum bounding shown in solid outline (e.g., box (802)) has been identified and tracked through at least 20 successive frames. This box (802) is therefore included in the further analysis.

In one embodiment, the tracking of the minimum bounding region may be implemented by comparing successive digital video frames to determine if a particular minimum bounding region having the same dimension (or similar dimensions) has an expected pixel displacement between successive digital video frames. The expected pixel displacement can be determined from a quantitative relationship involving the rotational direction of the drums (12, 14), the rotational speed of the drums (12, 14), the geometry of the drums (12, 14), the frame rate of the digital video, and a scaling factor between the pixel dimensions and actual dimensions of objects in the digital video frames. In other embodiments, the tracking of the minimum bounding region may be implemented by other tracking algorithms known to persons skilled in the art of digital image processing.

Optional Step 310: Determine longitudinal pixel coordinate of teeth based on determined pixel coordinates of minimum bounding regions.

As noted, the teeth (16) of a typical double roll crusher (10) are arranged in a series of "columns" spaced apart along in the longitudinal direction of the drums (12, 14)—i.e., the direction parallel to the axes of rotation of the drums (12, 14). Within each "column", the teeth (16) are spaced apart in the circumferentially of the drums (12, 14). The circumferential position of the minimum bounding regions (308) can be estimated from a quantitative relationship involving the geometry of the drums (12, 14), the frame rate of the digital video, and a scaling factor between the pixel dimensions and actual dimensions of objects in the digital video frames. It would also be desirable to be able to associate the estimated dimensions of the teeth (16) with the longitudinal position of the teeth (16), so that the location of wear phenomena can be monitored.

Figure 10:
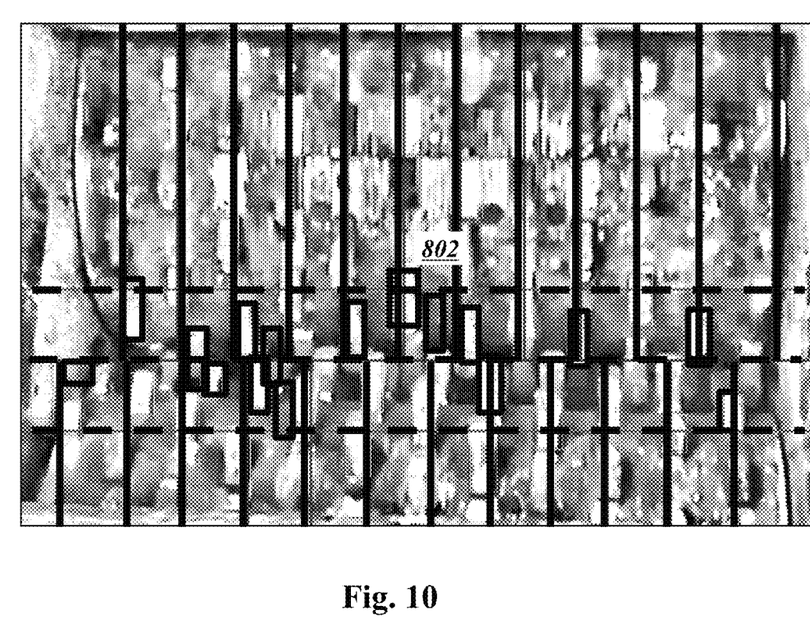
FIG. 10 shows the longitudinal location of roll crusher teeth in a digital video frame, as may be determined in an embodiment of the method of the present invention.

Accordingly, in optional step (310) (performed in accordance with the instructions of the tooth location module (210)), the method continues by determining the longitudinal position of the teeth (16) based on the longitudinal pixel coordinates to the minimum bounding regions determined in step (308). In the example of the digital video frame shown in FIG. 10, the longitudinal position is denoted by an "x" pixel coordinate in the horizontal direction of the digital video frame. In one embodiment, step (310) involves producing a histogram of the "x" pixel coordinates at the centroids of the minimum bounding regions (802). Step (310) then considers the highest frequency "x" pixel coordinates in the histogram (i.e., the modal pixel coordinates) to be indicative of the expected longitudinal position of the teeth (16) in the digital video frames. In FIG. 10, for example, for each of the drums (12, 14), the bold vertical lines are drawn at the determined position of the twelve highest frequency centroid "x" pixel coordinates of the minimum bounding regions (802). Minimum bounding regions (802) having centroid "x" pixel coordinates that are not within a threshold tolerance of one of the highest frequency "x" pixel coordinates may be excluded from subsequent analysis.

Step 312: Determine estimated dimension of teeth based on determined pixel coordinates of minimum bounding regions.

In step (312) (performed in accordance with the instructions of the tooth measurement module (212)), one embodiment of the method continues by determining an estimated dimension of the teeth (16) based on the pixel coordinates of the minimum bounding regions (802).

In one embodiment, the tooth dimension to be estimated is its length in the circumferential direction of the drum (12, 14). In FIG. 10, for example, the circumferential length of each tooth is estimated based on the "y" pixel length of one the minimum bounding regions (802) in the vertical direction of the digital video frame in FIG. 10, and an applied scaling factor that relates the pixel length to an actual dimension. Preferably, as shown in FIG. 10, the "y" pixel length of the minimum bounding regions (802) is determined when they are disposed in a portion of the digital video frame where the curvature of the drum (12, 14) has limited perspective distortion effect. In FIG. 10, for example, the "y" pixel lengths of the minimum bounding regions (802) are determined when they are disposed between a pair of dashed horizontal lines positioned near the center of the field of view of the digital video frames. In other embodiments, an alternative or additional dimension may be determined such as the longitudinal length of each tooth, estimated as the "x" pixel length of one of the minimum bounding regions (802) in the horizontal direction of the digital video frame in FIG. 10. Where multiple dimensions of the teeth (16) are estimated, the determined dimensions may be used to derive shape information about the teeth (16), such as an aspect ratio of the teeth (16): e.g., a ratio of the "y" pixel length to the "x" pixel length, or vice versa.

As noted, the delineation between the drums (12, 14) and their teeth (16), may be obscured by the presence of mined oil sand ore on their surfaces, or other phenomena, which may undermine the reliability of the estimated dimension of the teeth (16). To mitigate this problem, step (312) may determine the pixel dimensions of minimum bounding regions (802) for several digital video frames capturing a single rotation of the drum (12, 14) and/or several digital video frames capturing multiple rotations of the drum (12, 14). For a given tooth, step (312) may determine the estimated dimension of each tooth based on a statistical measure (e.g., a mean, a median, a mode, or a percentile) of those multiple estimates. In one embodiment, for example, the step (312) determines the circumferential length of each particular tooth based on the $90^{th}$ percentile of all the recorded "y" pixel lengths of the minimum bounding regions (802) corresponding to that tooth.

Step 314: Generate report of determined estimated dimension of teeth.

In step (314) (performed in accordance with the instructions of the report generation module (214)), the method concludes by generating a human-readable report of the determined dimension of the teeth. The report may be output to a display device (104), or some other output device such as a computer printer.

Figure 11:
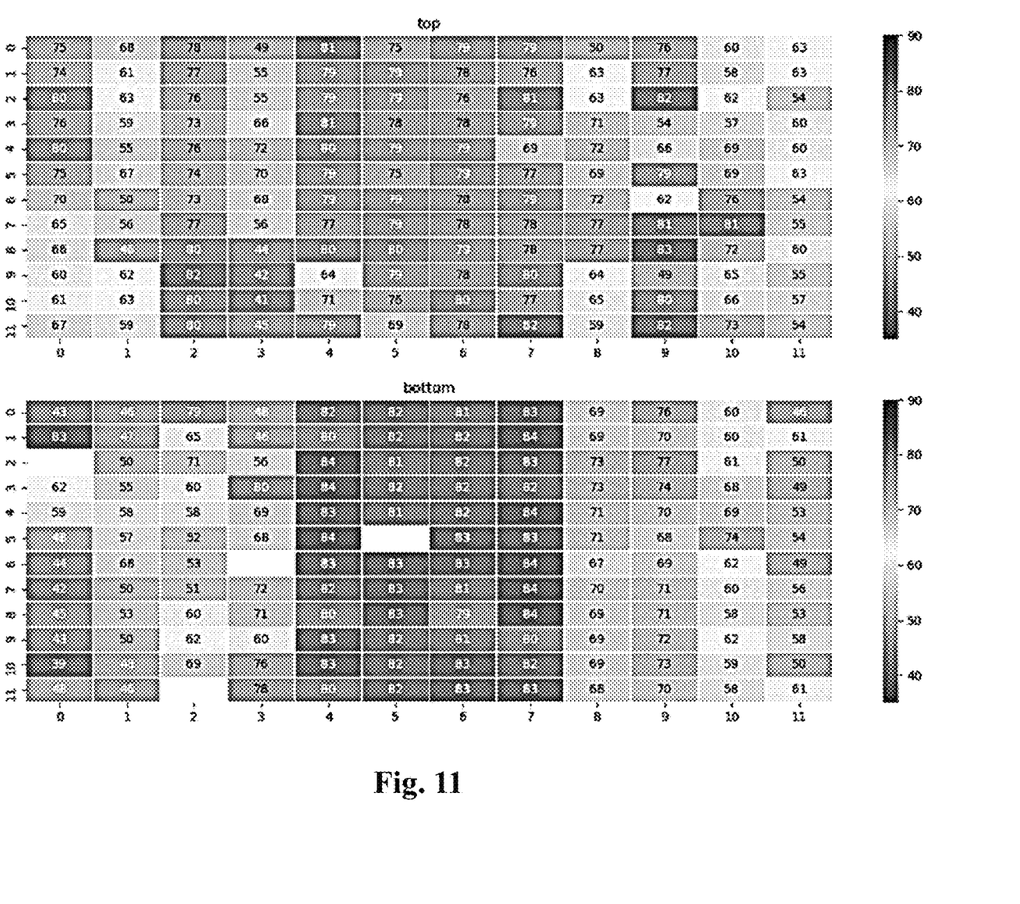
FIG. 11 shows an embodiment of a report of estimated lengths of double roll crusher teeth, as may be generated in an embodiment of the method of the present invention.

FIG. 11 shows an example of a report generated by an embodiment of the method of the present invention. The report includes two tables. The table labelled "top" is for the teeth (16) of the drum (12), while the table labelled "bottom" is for the teeth (16) of the drum (14). For each table, the column labels "0" to "11" designate a "column" of teeth (16) positioned along the longitudinal direction of the drum (12, 14), while the row labels "0" to "11" designate a "row" of teeth spaced circumferentially along the drum (12, 14). The numerical values within each cell of the table indicate the estimated length (in millimeters) of the one of the teeth (16) for the corresponding "column" and "row" position. Cells that do not include a numerical value indicate that the system (100) was unable to reliably estimate the length of the one of the teeth (16) for the corresponding "column" and "row" position. The cells of each table are color coded (shown by greyscale shading) to produce a "heat map"-like effect with colors depending on the determined length of the teeth (16). In other embodiments, the report may have a variety of different textual or graphical formats.

In testing of an embodiment of the system (100), it has been found that the system (100) is capable of estimating the length of the majority of the teeth within an absolute error of less than 2 mm.

Alternative modes of measuring wear of double roll crusher teeth.

The pixel length of the minimum bounding regions (802), as described above, is one mode of monitoring wear of the double roll crusher teeth (16). In other embodiments, the system may monitor wear of the double roll crusher teeth (16) in accordance with alternative or additional methods. In such cases, the minimum bounding region module (208), tooth location module (210), and tooth measurement module (212) as described above may not be necessary in some embodiments. Possible alternative or additional methods are as follows.

In one embodiment, after step (306) of segmentation of the digital video frames into pixels representative of the teeth ("tooth pixels"), and pixels non-representative of the teeth ("non-tooth pixels"), the method continues by determining the pixel area of the tooth pixels by summation of the number of the tooth pixels. This summation may be performed on an individualized tooth basis within each minimum bounding region (308), or on an aggregate basis for all teeth within all minimum bounding regions (308). A trend of decreasing pixel area of the tooth pixels over time may be indicative of wear of the teeth (16).

In one embodiment, after step (306) of segmentation of the digital video frames into pixels, representative of the teeth ("tooth pixels"), and pixels non-representative of the teeth ("non-tooth pixels"), the method continues by determining a shape factor of the tooth pixels. For example, the method may determine the circularity factor of discrete regions of tooth pixels within each minimum bounding region (308), in accordance with the expression $4\pi A/P^2$, where A is the area of the tooth pixels in the minimum bounding region (308), and P is the perimeter of the tooth pixels in the minimum bounding region (308). A trend of the circularity factor approaching unity over time may be indicative of rounding of the edges of teeth, associated with initial wear of the teeth.

Interpretation.

Aspects of the present invention may be described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or steps plus function elements in the claims appended to this specification are intended to include any structure, material, or act for performing the function in combination with other claimed elements as specifically claimed.

References in the specification to "one embodiment", "an embodiment", etc., indicate that the embodiment described may include a particular aspect, feature, structure, or characteristic, but not every embodiment necessarily includes that aspect, feature, structure, or characteristic. Moreover, such phrases may, but do not necessarily, refer to the same embodiment referred to in other portions of the specification. Further, when a particular aspect, feature, structure, or characteristic is described in connection with an embodiment, it is within the knowledge of one skilled in the art to affect or connect such module, aspect, feature, structure, or characteristic with other embodiments, whether or not explicitly described. In other words, any module, element or feature may be combined with any other element or feature in different embodiments, unless there is an obvious or inherent incompatibility, or it is specifically excluded.

It is further noted that the claims may be drafted to exclude any optional element. As such, this statement is intended to serve as antecedent basis for the use of exclusive terminology, such as "solely," "only," and the like, in connection with the recitation of claim elements or use of a "negative" limitation. The terms "preferably," "preferred," "prefer," "optionally," "may," and similar terms are used to indicate that an item, condition or step being referred to is an optional (not required) feature of the invention.

The singular forms "a," "an," and "the" include the plural reference unless the context clearly dictates otherwise. The term "and/or" means any one of the items, any combination of the items, or all of the items with which this term is associated. The phrase "one or more" is readily understood by one of skill in the art, particularly when read in context of its usage.

The term "about" can refer to a variation of ±5%, ±10%, ±20%, or ±25% of the value specified. For example, "about 50" percent can in some embodiments carry a variation from 45 to 55 percent. For integer ranges, the term "about" can include one or two integers greater than and/or less than a recited integer at each end of the range. Unless indicated otherwise herein, the term "about" is intended to include values and ranges proximate to the recited range that are equivalent in terms of the functionality of the composition, or the embodiment.

As will be understood by one skilled in the art, for any and all purposes, particularly in terms of providing a written description, all ranges recited herein also encompass any and all possible sub-ranges and combinations of sub-ranges thereof, as well as the individual values making up the range, particularly integer values. A recited range includes each specific value, integer, decimal, or identity within the range. Any listed range can be easily recognized as sufficiently describing and enabling the same range being broken down into at least equal halves, thirds, quarters, fifths, or tenths. As a non-limiting example, each range discussed herein can be readily broken down into a lower third, middle third and upper third, etc.

As will also be understood by one skilled in the art, all language such as "up to", "at least", "greater than", "less than", "more than", "or more", and the like, include the number recited and such terms refer to ranges that can be subsequently broken down into sub-ranges as discussed above. In the same manner, all ratios recited herein also include all sub-ratios falling within the broader ratio.

The invention claimed is:

1. A method for monitoring wear of teeth of a drum of a double roll crusher, the method implemented by a processor and comprising the steps of:
   (a) receiving a digital video capturing rotation of the drum and the teeth;
   (b) defining a region of interest in a frame of the digital video by using an image processing technique, such as optical flow, to identify pixels representative of the drum and the teeth;
   (c) for each region of interest of the frame, segmenting the region of interest of the frame into groups of contiguous pixels, wherein each group is representative of one of the teeth;
   (d) determining a parameter indicative of a geometry of at least one of the teeth based on at least one of the segmented groups of contiguous pixels in at least one of the regions of interest of the frames of the digital video; and
   (e) generating a human-readable report based on the parameter indicative of the geometry of the at least one of the teeth.

2. The method of claim 1, wherein the method further comprises, before the segmenting step (c), enhancing contrast of the frame.

3. The method of claim 1, wherein:
   (a) the method further comprises, after the segmenting step (c) and before the determining step (d), for each group of contiguous pixels, determining pixel coordinates of a minimum bounding region of the group of contiguous pixels; and
   (b) inclusion of any one of the minimum bounding regions in the determining step (d) is conditional upon either one or both of:
      (i) the one of the minimum bounding regions having a pixel dimension equal to or greater than a pre-determined minimum pixel dimension; or
      (ii) the one of the minimum bounding regions being tracked through a pre-determined minimum number of successive frames of the digital video.

4. The method of claim 3, wherein the method further comprises determining an estimate of the position of the at least one of the teeth based on the pixel coordinates of one of the minimum bounding regions in at least one of the frames of the digital video, and wherein the report is further based on the estimate of the position of the at least one of the teeth.

5. The method of claim 4, wherein determining the estimate of the position of the at least one of the teeth is based on a modal pixel coordinate of the pixel coordinates of the minimum bounding regions in a plurality of the frames of the digital video.

6. The method of claim 3, wherein the determining step (d) is based on a statistical measure of a plurality of estimates of the dimension of the at least one of the teeth, determined based on the pixel coordinates of at least one of the minimum bounding regions in a plurality of the frames of the digital video.

7. The method of claim 6, wherein the plurality of the frames of the digital video capture a single rotation of the drum.

8. The method of claim 6, wherein the plurality of the frames of the digital video capture a plurality of rotations of the drum.

9. The method of claim 1, wherein in the determining step (d), the parameter is a pixel length based on at least one of the segmented groups of continuous pixels.

10. The method of claim 1, wherein in the determining step (d), the parameter is a pixel area based on at least one of the segmented groups of continuous pixels.

11. The method of claim 1, wherein in the determining step (d), the parameter is a shape factor, based on at least one of the segmented groups of continuous pixels.

\* \* \* \* \*